United States Patent [19]

Brademeyer et al.

[11] Patent Number: 4,640,098
[45] Date of Patent: Feb. 3, 1987

[54] QUICK TAKE-UP MASTER CYLINDER VALVE ARRANGEMENT

[75] Inventors: David L. Brademeyer, Centerville; Timothy M. Welch, Dayton, both of Ohio

[73] Assignee: General Motors Corporation, Detroit, Mich.

[21] Appl. No.: 788,732

[22] Filed: Oct. 17, 1985

Related U.S. Application Data

[62] Division of Ser. No. 591,179, Mar. 19, 1984, abandoned.

[51] Int. Cl.[4] .............................................. B60T 11/08
[52] U.S. Cl. ........................................ 60/578; 60/585; 137/433
[58] Field of Search ................ 60/578, 574, 585, 592; 137/202, 433

[56] References Cited

U.S. PATENT DOCUMENTS 3,827,452 8/1974 Baumgarten ........................ 137/202
4,372,117 2/1983 Kobayashi ............................. 60/578

FOREIGN PATENT DOCUMENTS 28038 3/1981 Japan .................................... 60/578

*Primary Examiner*—Abraham Hershkovitz
*Attorney, Agent, or Firm*—D. D. McGraw

[57] ABSTRACT

Various buoyant valve arrangements are utilized to prevent quick take-up pressure from entering the master cylinder reservoir chamber until the quick take-up pressure reaches the desired value. A resiliently biased check valve is provided which opens at a predetermined quick take-up pressure to limit the amount of quick take-up pressure generated and then vents excess brake fluid from the quick take-up chamber into the reservoir chamber. The check valve may be resiliently biased by a spring or by elastic tension in an O-ring valve member.

2 Claims, 4 Drawing Figures

U.S. Patent   Feb. 3, 1987   4,640,098
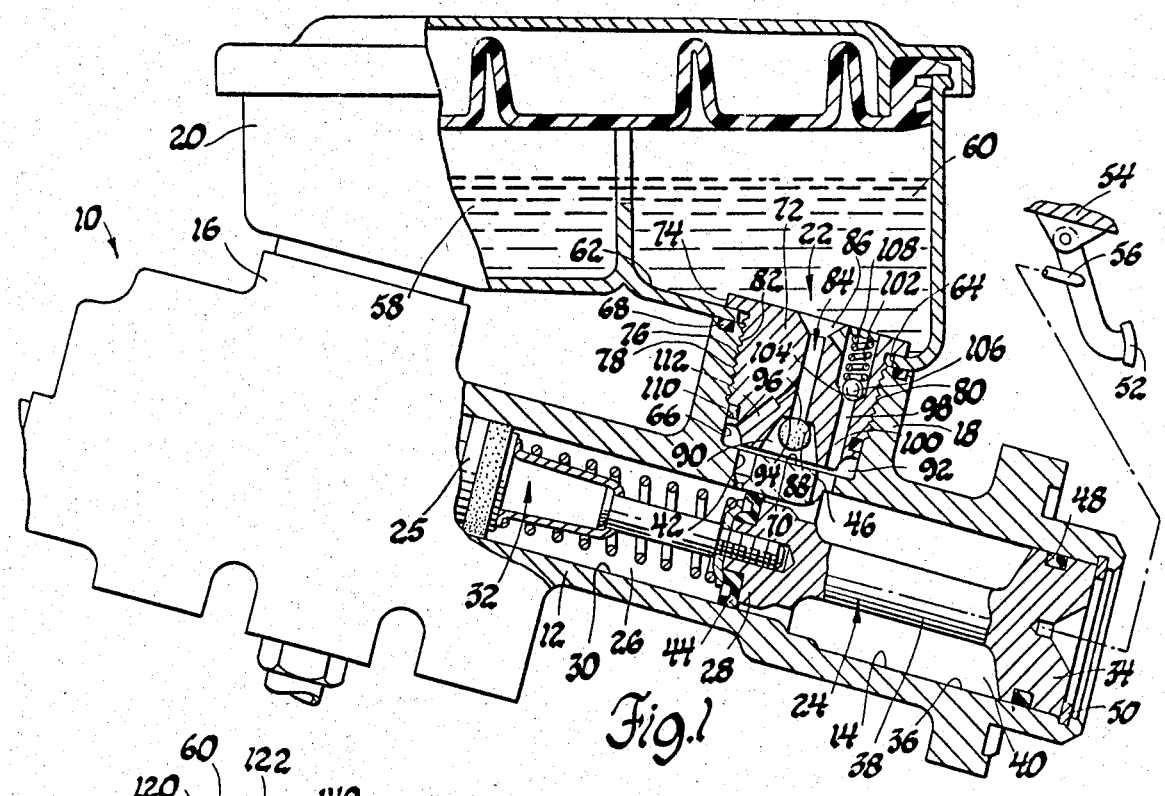
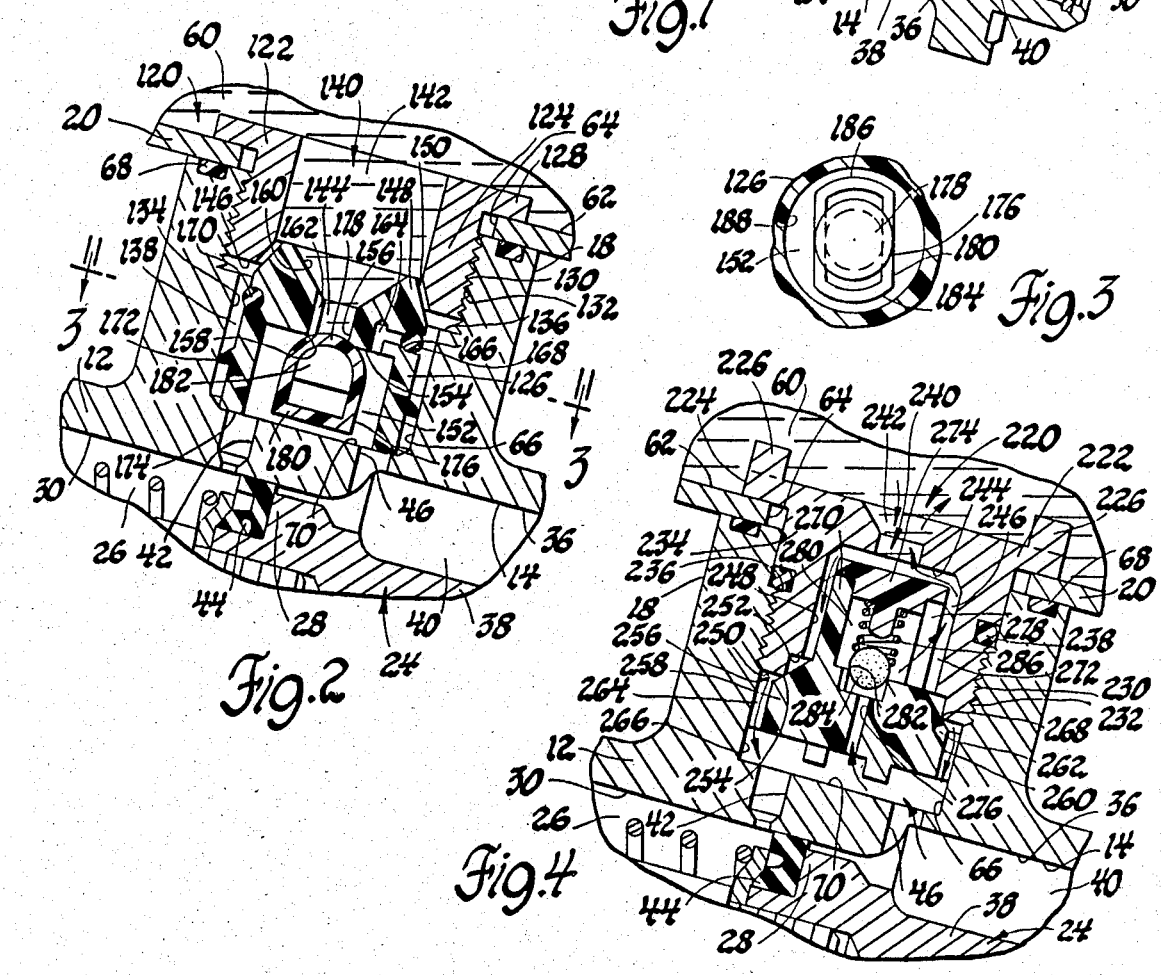

QUICK TAKE-UP MASTER CYLINDER VALVE ARRANGEMENT

This is a division of application Ser. No. 591,179 filed on Mar. 19, 1984, now abandoned.

The invention relates to a control valve arrangement for controlling the flow of hydraulic fluid between a master cylinder reservoir and the stepped bore of a quick take-up master cylinder during master cylinder operation. It more particularly relates to an arrangement wherein the flow control valve requires fluid flow in one direction to open the valve but does not require fluid flow in the opposite direction to close the valve. U.S. Pat. No. 3,913,327, issued Oct. 21, 1975, entitled "Flow Sensitive Valve Mechanism" and assigned to the common assignee, is concerned with a related arrangement wherein a valve is opened or closed in response to fluid movement, and requires such fluid movements to develop an opening force when the valve is closed and to develop a closing force when the valve is opened. It is a feature of the invention to use a float valve which also is a valve housing for a bypass control valve. The float valve will normally be closed in the rest position so that it will block hydraulic fluid flow from the quick take-up chamber of the master cylinder to the fluid reservoir during initial master cyliner apply. It therefore requires no fluid movement for the valve to be closed. Neither does it require a spring loaded arrangement. At a predetermined quick take-up pressure, the pressure in the quick take-up chamber is preferably vented to the reservoir.

A valve mechanism embodying the invention may be used in the same general arrangement as that shown in U.S. Pat. Nos. 4,133,178, issued Jan. 9, 1979 and entitled "Quick Take-Up Master Cylinder", 4,208,881, issued June 24, 1980 and entitled "Quick Take-Up Master Cylinder", or 4,498,299, issued Feb. 12, 1985 and entitled "Valve Assembly", by way of example.

IN THE DRAWING

FIG. 1 is an elevation view, with parts broken away and in section, showing a master cylinder assembly embodying a species of the invention claimed in the above-noted parent application. The view schematically includes some other portions of the vehicle brake system of which the master cylinder assembly is a part.

FIG. 2 is a fragmentary cross-section view of a modification of the valve mechanism of FIG. 1 and illustrates another species of the invention as originally claimed in the parent application.

FIG. 3 is a fragmentary cross-section view, taken in the direction of arrows 3—3 of FIG. 2 and illustrating a portion of the valve mechanism of that Figure.

FIG. 4 is a fragmentary cross-section view of the valve mechanism and a portion of the master cylinder assembly illustrating the embodiment of the invention to which this application is specifically directed.

The master cylinder assembly 10 includes a housing 12 formed to provide a stepped bore 14. Housing 12 has suitable reservoir support means, preferably constructed as bosses 16 and 18, which are integrally formed with the housing. They not only support the hydraulic fluid reservoir body 20 but one boss 18 also receives the valve mechanism 22 which is the subject of the invention herein disclosed and claimed. The master cylinder is illustrated as including a primary pressurizing piston 24 reciprocably received in bore 14. A secondary pressurizing piston 25 is received in the forward portion of bore 14 as is more fully disclosed in some of the above noted patents. A primary pressurizing chamber 26 is defined in a part of bore 14 by the piston land 28 forming the forward end of piston 24, and the rear end of secondary pressurizing piston 25. The primary piston forward land 28 and the secondary pressurizing piston 25 are received in a smaller diameter forward section 30 of bore 14. A suitable return spring and mechanical force transfer arrangement 32 is positioned forwardly of piston 24 and cooperates with the secondary pressurizing piston 25 in a manner well known in the art. Piston 24 is a stepped piston and has a rear piston head formed as a land 34. Land 34 is larger in diameter than the piston forward land 28. The rear piston land 34 is received in the larger diameter portion 36 of bore 14. A piston reduced diameter section 38 joins the rear piston land 34 and the forward piston land 28. Piston 24 cooperates with bore 14 to define a high volume, low pressure quick take-up chamber 40 between the piston forward land 28 and the piston rear land 34. In addition to the primary pressurizing chamber 26, a secondary pressurizing chamber, not shown, is provided forward of the secondary pressurizing piston 25, as is well known in the art. The primary and secondary pressurizing chambers are normally connected to separate brake actuating circuits as is well known and disclosed in one or more of the above noted patents. A compensation port 42 is provided in the master cylinder housing so that it normally communicates with chamber 26 just forward of the pressure cup seal 44, mounted on the piston forward land 28, when the master cylinder is in the released position illustrated in the drawing. Another compensation port 46 in the master cylinder housing opens into the quick take-up chamber 40. The pressure cup seal 44 is arranged to prevent fluid flow from pressurizing chamber 26 to the quick take-up chamber 40, while acting as a check valve which permits fluid flow from chamber 40 around the outer periphery of piston forward land 28 and the lip of pressure cup seal 44 when pressure in chamber 40 is greater than pressure in chamber 26. A seal 48 is mounted on piston land 34 to seal the rear end of chamber 40. A piston stop 50 is provided in the open end of the enlarged bore section 36 and forms an abutment engaged by piston land 34 when the master cylinder is in the fully released position shown in the drawing. Piston 24 is moved in the actuating direction under control of the vehicle operator through the schematically illustrated arrangement which includes a brake pedal 52 pivotally mounted on a suitable vehicle portion 54 and acting through a push rod 56 which operatively engages piston 24. It is to be understood that a suitable brake booster mechanism may be provided in a manner well known in the art.

The reservoir body 20 has a fluid chamber 58 which provides hydraulic fluid for the secondary pressurizing chamber as typically illustrated in one or more of the above noted patents. It also has a fluid chamber 60 providing brake fluid for chambers 26 and 40. The bottom 62 of chamber 60 is provided with an opening 64 which is positioned over a recess or passage 66 formed in boss 18. Bottom 62 engages a seal 68 provided in a groove in the top of boss 18 so that no leakage will occur between the reservoir body and the master cylinder housing. As will be described below, the valve mechanism 22 includes an arrangement for securing the reservoir body to the master cylinder housing. The bottom 70 of recess 66 has compensation ports 42 and 46 opening therethrough into the recess.

The valve mechanism 22, which is a compensation port control valve assembly, includes a valve housing 72 received in recess 66, the recess being a vertically oriented passage controlled by the valve mechanism 22. The upper end of valve housing 72 is formed to include a flange 74 extending radially outward so that it extends beyond the opening 64 in reservoir bottom 62 and engages the upper surface of the reservoir bottom. When the valve mechanism is properly installed, flange 74 retains the reservoir bottom in tight sealing relation with seal 68. The valve housing 72 also acts as the securing means for locating and retaining the reservoir body 20 on boss 18. For this purpose the outer wall 76 of valve housing 72 has a portion provided with external threads 78 which cooperate with internal threads 80 formed on a portion of the side wall 82 of recess 66. Any of several suitable drive arrangements for threading the valve housing into the recess may be used.

Valve housing 72 has a passage 84 formed axially therethrough with its upper end 86 opening into reservoir chamber 60. The lower portion of passage 84 is formed with a shoulder 88 so as to provide the passage with an enlarged portion forming a valve chamber 90. Valve chamber 90 opens into a chamber 92 formed in the bottom portion of boss passge 66, chamber 92 being that portion of passage 66 which is in fluid communication with compensation ports 42 and 46. Thus passage 84 is formed in the manner of a stepped bore through the valve housing 72.

The inner annular portion of shoulder 88 formed by passage 84 provides a valve seat 94. A valve is contained within valve chamber 90. Valve 96 is illustrated in FIG. 1 as being a ball-type valve and is made of a suitable material unaffected chemically by the brake fluid in the system and having a specific gravity less than the specific gravity of the hydraulic brake fluid in the valve chamber 90. It, therefore, normally buoyantly rests against the valve seat 94 and prevents any substantial flow of hydraulic brake fluid between the master cylinder bore 14 and the reservoir chamber 60 through the compensation ports 42 and 46 when the valve mechanism 22 is in such a condition of operation that the valve is seated on its seat. No spring is used to act on valve 96 in order to resiliently urge it toward its valve seat. Its bouyant characteristic accomplishes this.

A bypass passage 98 is formed through housing 72 and is illustrated in FIG. 1 as being substantially parallel to passage 84 but laterally spaced therefrom. The lower portion 100 of bypass passage 98 also opens into chamber 92. An enlarged upper portion 102 of passage 98 opens into reservoir chamber 60. A shoulder 104 formed in passage 98 separates the lower passage portion 100 from the larger upper passage portion 102 and also acts as a valve seat for a check valve 106 contained in the larger upper portion 102 of passage 98. Check valve 106 is continually urged toward valve seat 104 by a suitable spring 108 positioned and retained in the upper passage portion 102.

A seal 110 on the lower end of the valve housing 72 cooperates with the wall of the vertically oriented recess or passage 66 so as to seal chamber 92 against leakage along the outer wall of recess 66 into the area where threads 78 and 80 are located. A small pressure balancing bypass passage 112 is formed in valve housing 72 and provides continuous but very limited fluid communication between chamber 92 and the portion of valve housing passage 84 above the valve seat 94. Passage 112 is extremely small in diameter so that it has no substantial effect on the dynamic pressures acting during master cylinder operation, but provides for equalization of pressures in the chamber 92 and therefore in the quick take-up chamber 40 relative to the reservoir chamber 60 when the master cylinder is at rest. The function of this passage is more fully covered in some of the patents noted above and forms no particular part of the invention herein claimed.

During initial actuation of the master assembly 10, the piston 24 is moved leftwardly as seen in FIG. 1. The cup seal 44 moves to close off compensation port 42 so that further movement of the piston land 28 and seal 44 in the leftward direction results in pressurization of brake fluid in chamber 26. This also results in the movement of the secondary pressurizing piston 25 to pressurize brake fluid in the secondary pressurizing chamber. The leftward movement of piston 24 also causes fluid in the quick take-up chamber 40 to be pressurized. The fluid in chamber 40 is also acted on by a considerably larger effective piston area because of the larger size of piston land 34 as compared to land 28, so that a greater quantity of brake fluid is displaced from chamber 40 in relation to the amount of piston movement as compared to fluid displacement from primary pressurizing chamber 26. The fluid being displaced from quick take-up chamber 40 at low pressure passes around seal 44 and into secondary pressurizing chamber 26 so that a relatively large quantity of hydraulic brake fluid is delivered to the brake circuit connected with pressurizing chamber 26. This quick take-up pressure can be generated in quick take-up chamber 40 because valves 96 and 106 are seated against their respective valve seats 94 and 104, preventing fluid from returning to the reservoir chamber 60 through passage 84 or bypass passage 98. Spring 108 is of sufficient force to hold check valve 106 against its valve seat 104 until a predetermined quick take-up pressure is reached, preventing fluid from passing through bypass passage 98 into reservoir chamber 60 from quick take-up chamber 40 during the initial actuation stage. When the desired quick take-up pressure is attained in chamber 40, the pressure acts on and moves check valve 106 away from its valve seat 104 against the force of spring 108, relieving any further quick take-up pressure increase to the reservoir chamber 60. As noted in some of the patents mentioned above, it is preferable that this occurs at about the time that the required brake quick take-up action has been completed and the brakes are ready for braking actuation.

Upon brake release, the volume of quick take-up chamber 40 increases very quickly as piston 24 moves rightwardly toward the released position. It therefore requires compensation by drawing brake fluid from reservoir chamber 60. This is accomplished because the drop in pressure in quick take-up chamber 40 is sufficient to permit flow of brake fluid through passage 84 with movement of valve 96 away from its valve seat 94. Valve 96 responds to the pressure differential bias created by the low pressure in quick take-up chamber 40. After the piston 24 has moved to the fully released position illustrated in the drawing, valve 96 will buoyantly rise to again engage valve seat 94 and close passage 84.

The modification illustrated in FIGS. 2 and 3 is the subject of another divisional application Ser. No. 787,733 filed on even date herewith. FIG. 2 shows the valve assembly 120, comparable to valve mechanism 22 of FIG. 1, with a valve housing 122 formed by two valve housing sections 124 and 126. Valve housing section 124 is constructed somewhat similar to the upper portion of valve housing 72 of FIG. 1 in that it has a flange 128 cooperating with the reservoir housing bottom 62 and seal 68 to retain the reservoir housing on the boss 18 as described with regard to FIG. 1. Housing section 124 has external threads 130 mating with internal threads 132 formed in the upper portion of the boss passage 134 and cooperating in the same manner as threads 78 and 80 of FIG. 1. The vertically oriented boss passage 134, containing the valve assembly 120, is provided with a generally centrally located shoulder 136 separating the slightly enlarged upper portion of the passage, in which internal threads 132 are formed, from the slightly smaller diameter lower passage portion 138. The valve housing section 126 is positioned primarily in the lower passage portion 138. The two housing sections, when mating together as shown in the assembled position in FIG. 2, have cooperatively formed therethrough a vertically oriented passage 140 comparable to passage 84 of FIG. 1. The upper passage section 142 of passage 140 is formed axially through the valve housing section 124 and the lower passage section 144 thereof is axially formed through the valve housing section 126. Upper passage section 142 opens through the lower end 146 of valve housing section 124 and is preferably frusto-conically formed to cooperate with a frusto-conically shaped upper end 148 of valve housing section 126. Grooves formed in the frusto-conical portion of upper passage section 142 provide passages 150 connecting the upper passage section 142 above valve housing section 126 with the portion of passage 134 located axially between shoulder 136 and the lower end 146 of the valve housing section 124.

The valve housing section 126 has its passage section 144 formed as a stepped bore, with an enlarged lower portion defining a valve chamber 152 which opens into the lower end of recess or passage 134 as defined by recess bottom 70. It is also in continuous fluid communication with compensation ports 42 and 46 and quick take-up chamber 40. The passage shoulder 154 defining the upper end of valve chamber 152 has a smaller diameter passage portion 156 of passage 144 with its lower end opening through shoulder 154 to define a valve seat 158. The upper end of passage portion 156 is enlarged in a generally conically shaped manner as seen at 160 to provide substantially unrestricted fluid communication into the upper passage section 142. Another passage 162, which may be formed by a groove in the side of passage portion 156, provides the pressure equalization by-pass passage similar in function to passage 112 of FIG. 1 discussed above. Another passage 164 is formed in valve housing section 126 and is generally L-shaped as illustrated in FIG. 2. Its lower end opens into the valve chamber 152 through shoulder 154 and radially outward of the valve seat 158. The upper end portion, which turns to extend radially outward of the valve housing section 126, is provided with a shoulder 166, outwardly beyond which is a slightly enlarged passage portion opening into an annular groove 168 formed on the outer periphery of the valve housing section 126. An O-ring seal 170 is fitted within groove 168 so that it seats against shoulder 166 and cooperates therewith to form a check valve. Seal 170 is smaller in inner annular diameter than groove 168 and is smaller in the diameter of its torus than the axially extending width of groove 168. Groove 168 opens into the lower passage portion 138, the outer periphery of the valve housing section 126 being such that the valve housing is in radially inwardly spaced relation to the wall of the lower passage portion 138. Therefore the groove 168 is in fluid communication with upper passage 142 through passage 150 at all times, and any fluid from valve chamber 152 can flow through passage 164 when the check valve formed by the O-ring seal 170 is opened.

The lower part of valve housing section 126 containing valve chamber 152 has a flange 172 formed thereon below groove 168 and above the end surface 174 of the housing section 126. Housing section 126 is preferably formed of a suitable plastic material so that flange 172 may be slightly flexible and provide a seal where it engages the wall of the lower passage portion 138. When assembled, the end surface 174 of valve housing section 126 engages the bottom 70 and is held in engagement therewith when the valve housing section 124 is threaded into position within the boss as shown in FIG. 2.

The valve 176 contained in valve chamber 152 is preferably formed with a hemispherical upper portion defining a valve head 178 in cooperable valving relation with the valve seat 158. Valve 176 has a base portion 180 extending below the valve head 178 so that it is axially above and spaced from the bottom 70 when the valve head 178 is in valving engagement with its valve seat 158. Thus the valve 176 is allowed some downward movement before the base portion 180 engages bottom 70, opening the valve head relative to valve seat 158 to allow fluid to flow through passage section 156 into valve chamber 152 and compensation ports 42 and 46. The valve 176 is provided with float material 182 within the valve head 178 so that the valve is always oriented with the valve head upwardly due to the buoyancy of the float material 182, it being understood that the float material has a substantially lower specific gravity than the hydraulic brake fluid in the system. In some instances valve 176 may be constructed entirely of a low specific gravity material instead of a twopiece arrangement illustrated in FIG. 2. The outer portion of valve 176 in FIG. 2 may be a material having a higher specific gravity than the float material 182, for example, so long as the specific gravity of the entire valve 176 remains less than the specific gravity of the hydraulic brake fluid in the valve chamber 152.

The arrangement of FIG. 2 operates in a similar manner to that of FIG. 1. The resilient bias built into the O-ring seal check valve 170 is such that the quick take-up pressure being generated will move the O-ring seal outwardly from shoulder 166 when the quick take-up pressure reaches the desired value for venting the quick take-up chamber 40 to the reservoir chamber 60. Upon releasing movement of the piston 24, fluid will be removed from reservoir chamber 60 through passage 140, acting against the valve head 178 and the buoyancy of the valve 176 to move the valve downwardly to open the lower end of the passage portion 156, allowing the fluid to flow through the valve chamber 152 and compensation port 46 into quick take-up chamber 40.

FIG. 3 illustrates the preferred construction of valve 176 in somewhat greater detail. It shows the valve base 180 having opposed sides 184 and 186 extending radially outward relative to the valve head 178 so that they approach but do not touch the valve chamber side wall 188. The base sides 184 and 186 are arcuately formed at their radially outward ends to conform to the valve chamber side wall 188. This arrangement keeps the valve 176 in proper axial alignment and prevents it from any adverse cocking action within the valve chamber 152. At the same time it allows substantially unrestricted brake fluid flow around the valve base 180 when such flow occurs.

FIG. 4 shows the invention being specifically claimed herein. The valve assembly 220, comparable to the valve mechanism 22 of FIG. 1 and the valve assembly 120 of FIG. 2, has a valve housing 222 provided with a flange 224 cooperating with the reservoir housing bottom 62 and seal 68 to retain and seal the reservoir housing on the boss 18 as described with regard to FIGS. 1 and 2. Flange 224 is illustrated as having a series of circumferentially spaced lugs 226 extending upwardly from the flange so that they permit ready engagement of a suitable tool for installing the valve housing in place. Valve housing 222 has external threads 230 mating with internal threads 232 formed in the upper portion of the boss passage 234 and cooperating in the same manner as the threads 78 and 80 of FIG. 1 or threads 130 and 132 of FIG. 2. The vertically oriented boss passage 234, containing valve assembly 220, has a shoulder 236 positioned immediately above internal threads 232, shoulder 236 being engaged by a seal 238 positioned in a peripheral groove formed in a portion of the valve housing 222. Passage 234 has a lower portion extending from immediately below the internal threads 232 to the passage or recess bottom 70. Compensation ports 42 and 46 communicate with the lower portion of passage 234 through bottom 70.

Valve housing 222 has a vertically oriented passage 240 formed therethrough comparable to passage 84 of FIG. 1 and passage 140 of FIG. 2. The upper section 242 of passage 240 opens through the flange 224 of valve housing 222 into the reservoir chamber 60. A shoulder 244 in passage 240 separates upper passage section 242 from the enlarged lower passage section 246. The wall 248 of passage section 246 extends downwardly to a point adjacent but above the lower end 250 of valve housing 222, at which point another shoulder 252 provides a passage section transition to a slightly larger portion of the passage section. The inner annular corner of the valve housing lower end 250 forms a valve seat 254. Passage lower section 246 and the lower portion of passage 234 between the lower end of internal threads 232 and the recess bottom 70 cooperate to define a valve chamber 256.

Valve means 258, including the valve assembly 260 and cooperative portions of the walls of passages 234 and 240, including valve seat 254, are contained in the valve chamber 256. Valve assembly 260 includes a valve body 262 which is made of a suitable material having a sufficiently lower specific gravity than the hydraulic brake fluid in the system to be continuously buoyantly urged upwardly in the valve chamber. The valve body buoyancy is such that the overall valve assembly 260 tends to float upwardly in the valve chamber to accomplish this result. The valve body lower portion is provided with suitable flutes 264, which form grooves around the lower portion of the valve body, the flutes 264 being in guiding and sliding engagment with the side wall 266 of the lower portion of passage 234. An intermediate portion 268 of the valve body 262 is frustoconically formed so as to taper to a smaller diameter upper portion 270 of the valve body. The frusto-conically tapered intermediate portion 268 forms a valve member in mateable engagement with the valve seat 254 when the valve body is in its buoyant upward position illustrated in the drawing. As will be described below, the valve body 262 can move downwardly within the valve chamber 256 and the valve member formed by portion 268 will open relative to the valve seat 254 to allow the flow of fluid through the valve formed thereby. The valve body upper portion 270 is provided with flutes 272 extending along the outer peripheral side thereof so that the flutes are in slidable relation with the wall 248 of the enlarged end section 246 in which the valve body upper portion 270 is contained. The grooves or passages formed by the flutes 272 permit fluid communication between passage section 242 to the valve seat 254 at all times, and when valve member 268 is disengaged from valve seat 254, to the lower portion of passage 234 and compensation ports 46 to quick take-up chamber 40.

The upper end 274 of valve body 262 is always spaced axially below the shoulder 244 so that it at no time restricts passage section 242.

A passage 276 is formed axially through the valve body 262, with the valve body end 274 being formed as a closure cap closing the upper end of passage 276. However, the upper portion of the valve body immediately underneath upper end cap 274 is provided with laterally extending openings 278 which open into one or more of the grooves between the flutes 272 so that the enlarged upper portion 280 of passage 276 is always in fluid communication with the enlarged lower section 246 of passage 240. Passage 276 has a shoulder therein forming a valve seat 282 at the bottom of passage enlarged upper portion 280. A ball check valve 284 is continually urged toward engagement with valve seat 282 by a spring 286 within passage enlarged upper portion 280. One end of spring 286 is located relative to and reacts against the upper end cap 274 so that the spring and ball check valve are retained in passage upper portion 280. Thus, ball check valve 284 controls the flow of fluid through passage 276 from the lower portion of the valve chamber 256 adjacent recess bottom 70.

When the master cylinder is at rest in the fully released position, the valve assembly 260 is buoyantly positioned as shown in FIG. 4, with the valve seats 268 and 282 being closed by their respective cooperating valve members. During initial master cylinder actuation, the quick take-up pressure generated in chamber 40 only tends to urge the valve assembly 260 upwardly to a greater extent, and does not overcome the force of spring 286 until the requisite quick take-up pressure is reached. At that point, the quick take-up pressure acts against valve 284 to lift it from its seat 282 and allow excess quick take-up pressure to be vented to the reservoir chamber 60. When the master cylinder is released and the piston 24 moves toward the postion shown in FIG. 1, the volume of quick take-up chamber 40 is increased quickly and fluid must be provided to fill that volume. The pressure decrease on the bottom of valve assembly 260 will overcome the buoyant effect of the valve body 262, moving the valve assembly 260 downwardly in the valve chamber to open the valve seat 254. This provides a fluid passage around the valve body 262 from reservoir chamber 60 to the compensation port 46 and quick take-up chamber 40.

The embodiments of the invention in which an exclusive property or privilege is claimed arm defined as follows:

1. In a quick take-up master cylinder having a boss with a vertically oriented valve-controlled first passage, compensation ports at the bottom of said first passage connecting with the master cylinder bore, and a hydraulic fluid reservoir mounted on the upper end of said boss and maintaining a supply of hydraulic fluid in said first passage and the master cylinder bore, a compensation port control valve assembly comprising:

a housing having its lower end sealingly secured in said vertically oriented valve-controlled passage and having a vertically extending stepped bore having a shoulder and providing a valve chamber open to the compensation ports and an upper passage section open to said hydraulic fluid reservoir;

valve means in said valve chamber having a specific gravity less than the specific gravity of the hydraulic fluid in said first passage so as to normally buoyantly rest against said shoulder and prevent any substantial flow of hydraulic fluid between said master cylinder bore and said reservoir through the compensation ports in one valve means condition of operation, said valve means being sensitive to a pressure differential at said shoulder biased toward the master cylinder bore to move downwardly away from said first shoulder and permit fluid flow through said valve housing bore from said reservoir to said master cylinder;

said valve means including a valve body having a base section provided with fluted guides circumferentially spaced thereon for guiding said body in vertical movements in said valve chamber, an axially extending second passage through said base section, a check valve caging section above said base section having an annular valve seat therein with said second passage opening below and to said annular valve seat, a check valve retained in said caging section above said annular valve seat and having means resiliently biasing said check valve toward said annular valve seat to normally close said second passage, and a valve cap on said caging section, said valve cap and said caging section permitting hydraulic fluid flow therepast;

said resiliently biased check valve controlling said second passage to normally prevent fluid flow through said second passage between said master cylinder bore and said reservoir and operable to open at a predetermined master cylinder quick take-up pressure to permit fluid flow from said master cylinder bore to said reservoir through said second passage and past said caging section and said valve cap to relieve any excess quick take-up pressure that may be generated in said master cylinder bore during master cylinder actuation.

2. In a quick take-up master cylinder having a boss with a vertically oriented valve-controlled passage, compensation ports at the bottom of said passage connecting with the master cylinder bore, and a hydraulic fluid reservoir mounted on the upper end of said boss and maintaining a supply of hydraulic fluid in said passage and the master cylinder bore, a compenaation port control valve assembly comprising:

housing means including a valve housing received in said vertically oriented valve-controlled passage, said housing means having a vertically extending stepped bore having a shoulder and providing a valve chamber open to the compensation ports and an upper passage section open to said hydraulic fluid reservoir, said housing means providing valve seats;

valve means in said valve chamber including said valve housing having a valve head formed to seat on said shoulder and a valve body extending from said valve head and having spaced open-formed segments on said valve body slidably engaging the side wall of said valve chamber in valve means guiding relation, said valve head normally buoyantly resting against said shoulder and preventing any substantial flow of hydraulic fluid between the master cylinder bore and said reservoir through said compensation ports in one valve means condition of operation, said valve head being engageable with the bottom of said valve chamber to limit the amount of valve opening movement away from said shoulder while permitting substantially unrestricted hydraulic fluid access through and around said valve housing and also having spaced open-formed segments slidably guiding said valve means in said housing means valve-controlled passage;

said valve means having an axially extending valve bypass passage through said valve head and defining an annular valve seat at its upper end, said valve body spaced open-formed segments also defining a check valve caging section having a check valve retained therein above said annular valve seat, means resiliently biasing said check valve toward said annular valve seat to normally close said bypass passage, and a valve cap on said caging section, said valve cap and said caging section permitting hydraulic fluid flow therepast;

said valve means having a volume-related mass of sufficiently less specific gravity of the hydraulic fluid to make said valve means lighter than the hydraulic fluid it displaces so that said valve head is continually urged upwardly by its buoyancy toward said shoulder with said valve body extending above said head, said shoulder providing one of said valve seats, said valve means being sensitive to a pressure differential biased toward the master cylinder bore from said reservoir to move said valve head downwardly away from said shoulder and permit fluid flow through said valve housing bore from said reservoir to said master cylinder;

said resiliently biased check valve controlling said bypass passage to normally prevent fluid flow through said bypass passage between said reservoir and said master cylinder bore and operable to open at a predetermined master cylinder quick take-up pressure to permit fluid flow from said master cylinder bore to said reservoir through said bypass passage and past said caging section and said valve cap to relieve any excess quick take-up pressure that may be generated in said master cylinder bore during master cylinder actuation.

* * * * *